US009921985B2

(12) United States Patent
Triece et al.

(10) Patent No.: US 9,921,985 B2
(45) Date of Patent: *Mar. 20, 2018

(54) DIRECT MEMORY ACCESS CONTROLLER

(71) Applicant: Microchip Technology Incorporated, Chandler, AZ (US)

(72) Inventors: Joseph W. Triece, Phoenix, AZ (US); Rodney J. Pesavento, Chandler, AZ (US); Gregg D. Lahti, Gilbert, AZ (US); Steven Dawson, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/860,398

(22) Filed: Sep. 21, 2015

(65) Prior Publication Data

US 2016/0011998 A1 Jan. 14, 2016

Related U.S. Application Data

(63) Continuation of application No. 11/928,132, filed on Oct. 30, 2007, now Pat. No. 9,141,572.

(Continued)

(51) Int. Cl.
*G06F 13/28* (2006.01)
*G06F 13/00* (2006.01)
(Continued)

(52) U.S. Cl.
CPC .......... *G06F 13/34* (2013.01); *G06F 13/1689* (2013.01); *G06F 13/285* (2013.01); *G06F 13/30* (2013.01); *G06F 13/4022* (2013.01)

(58) Field of Classification Search
None
See application file for complete search history.

(56) References Cited

U.S. PATENT DOCUMENTS

| 4,989,113 A | 1/1991 | Hull, Jr. et al. ............... 364/200 |
| 5,367,639 A | 11/1994 | Sodos |

(Continued)

FOREIGN PATENT DOCUMENTS

| EP | 0530543 | 8/1992 | ............. G06F 13/32 |
| EP | 0825539 | 2/1998 | ............. G06F 13/28 |

(Continued)

OTHER PUBLICATIONS

International Search Report and Written Opinion, PCT/US2007/087594, 13 pages, dated Apr. 23, 2008.

(Continued)

*Primary Examiner* — Michael Sun
(74) *Attorney, Agent, or Firm* — Slayden Grubert Beard PLLC

(57) ABSTRACT

A system has at least one bus, a central processing unit (CPU) coupled with the bus, a memory coupled with the bus, a direct memory access (DMA) controller having a plurality of DMA channels and operating independently from the CPU and being coupled with the bus, wherein for access to the bus the DMA controller is programmable in a first mode to have priority over the CPU and in a second mode in which at least one DMA channel of the DMA controller is suspended from accessing the bus.

20 Claims, 9 Drawing Sheets

Related U.S. Application Data

(60) Provisional application No. 60/870,295, filed on Dec. 15, 2006, provisional application No. 60/870,267, filed on Dec. 15, 2006.

(51) Int. Cl.
  *G06F 13/34* (2006.01)
  *G06F 13/30* (2006.01)
  *G06F 13/16* (2006.01)
  *G06F 13/40* (2006.01)

(56) References Cited

U.S. PATENT DOCUMENTS

| | | | |
|---|---|---|---|
| 5,517,626 A | 5/1996 | Archer et al. | 710/110 |
| 5,535,362 A | 7/1996 | Ami et al. | 395/474 |
| 5,574,575 A | 11/1996 | Kato | 358/474 |
| 5,637,932 A | 6/1997 | Koreeda et al. | 307/125 |
| 5,649,213 A | 7/1997 | Kurihara et al. | 395/750 |
| 5,826,106 A * | 10/1998 | Pang | G06F 13/28 710/25 |
| 5,828,856 A | 10/1998 | Bowes et al. | 710/308 |
| 5,875,312 A | 2/1999 | Walsh et al. | 710/303 |
| 5,892,977 A | 4/1999 | Nakamura | 710/21 |
| 5,896,550 A | 4/1999 | Wehunt | 710/26 |
| 5,898,879 A | 4/1999 | Kim | 395/750.04 |
| 5,983,301 A | 11/1999 | Baker et al. | 710/113 |
| 6,154,793 A | 11/2000 | Mackenna et al. | 710/23 |
| 6,434,645 B1 | 8/2002 | Parvin et al. | 710/72 |
| 6,467,009 B1 | 10/2002 | Winegarden et al. | 710/305 |
| 6,560,712 B1 | 5/2003 | Arends et al. | 713/320 |
| 6,697,906 B1 | 2/2004 | Ayukawa et al. | 710/316 |
| 6,701,405 B1 | 3/2004 | Adusumilli et al. | 710/308 |
| 6,738,881 B1 * | 5/2004 | Ollivier | G06F 13/28 370/329 |
| 7,057,754 B1 | 6/2006 | Tsuchiya et al. | 358/1.15 |
| 7,062,664 B2 | 6/2006 | Date et al. | 713/320 |
| 7,779,172 B2 | 8/2010 | Sasaki et al. | 710/22 |
| 9,141,572 B2 | 9/2015 | Triece et al. | G06F 13/30 |
| 2004/0087351 A1 | 5/2004 | Paver et al. | 455/574 |
| 2005/0102478 A1 | 5/2005 | Tanaka et al. | 711/152 |
| 2005/0149771 A1 | 7/2005 | Todoroki et al. | 713/300 |
| 2005/0210221 A1 | 9/2005 | Mitsuishi | 712/39 |
| 2005/0256979 A1 | 11/2005 | Lin | 710/22 |
| 2006/0020765 A1 | 1/2006 | Mahrla et al. | 711/170 |
| 2007/0073826 A1 | 3/2007 | Isani et al. | 709/214 |
| 2007/0130383 A1 | 6/2007 | Dahan et al. | 710/22 |
| 2007/0162648 A1 | 7/2007 | Tousek | 710/22 |
| 2009/0204831 A1 * | 8/2009 | Cousson | G06F 1/3203 713/322 |

FOREIGN PATENT DOCUMENTS

| | | | |
|---|---|---|---|
| EP | 1612648 | 6/2005 | G06F 1/32 |
| TW | 494304 | 7/2002 | G06F 1/04 |
| TW | I258077 | 7/2006 | G06F 12/00 |
| TW | I259955 | 8/2006 | G06F 12/00 |
| WO | 91/00566 | 1/1991 | G06F 1/32 |

OTHER PUBLICATIONS

International Search Report and Written Opinion, Application No. PCT/US2007/087592, 13 pages, dated Jun. 20, 2008.

Second Office Action of China State Intellectual Property Office with English Translation for Application No. 200780046013.0 (8 pages), dated Nov. 8, 2010.

First Office Action of China State Intellectual Property Office with English Translation for Application No. 200780046013.0, 13 pages, dated Jul. 7, 2010.

First Office Action of China State Intellectual Property Office with English Translation for Application No. 200780046042.7, 18 pages, dated Sep. 13, 2010.

Third Office Action of China State Intellectual Property Office (with English translation), Chinese patent application No. 200780010701.1, 8 pages, dated Mar. 17, 2011.

Taiwan Office Action, Application No. 096147711, 12 pages, dated Aug. 12, 2013.

Taiwan Office Action, Application No. 096147710, 7 pages, dated Sep. 2, 2013.

* cited by examiner

DIRECT MEMORY ACCESS CONTROLLER

CROSS REFERENCE TO RELATED APPLICATIONS

This application is a Continuation of U.S. patent application Ser. No. 11/928,132 filed on Oct. 30, 2007, which claims the benefit of U.S. Provisional Application No. 60/870,295 filed on Dec. 15, 2006, and U.S. Provisional Application No. 60/870,267 filed on Dec. 15, 2006, which are incorporated herein in their entirety.

TECHNICAL FIELD

The technical field of the present application relates to a direct memory access controller.

BACKGROUND

Direct memory access controller (DMA) are typically used in microprocessor systems, integrated microcontrollers, etc. DMA controllers are used to perform a data transfer from and to memory to and from a peripheral independently from the central processing unit of the computer system. To this end, a DMA controller can be seen as a second programmable processing unit with limited capabilities. Generally, a DMA controller is instructed to transfer a specific amount of data from a source location to a destination location. The source can be within a memory, for example, a data memory of a microcontroller, memory of a peripheral, or data generated by or accessible within a peripheral, such as an analog to digital converter, a port, a capture compare unit, etc. The destination can also be within a memory, thus, allowing high speed transfers within a memory device of a computer system or microcontroller. However, the destination can also be a peripheral, such as a digital to analog converter, a port, etc. To transfer data from a source to a destination the DMA controller must receive the respective source and destination addresses. In addition, each transfer length needs to be specified. To this end, the DMA controller needs to receive either the length of the data transfer or the start and end address of the data to be transferred.

Moreover, DMA controllers are used to support the central processing unit (CPU) in a system, in particular for lengthy data transfers. The CPU is then free to perform other functions. However, CPU and DMA controller share the same memory bus system. Thus, to prohibit any type of collision between CPU and DMA when accessing the bus, which may stall the DMA by the CPU, the DMA usually has priority over the CPU which is prohibited from accessing the memory bus while a transfer is in progress. Even though the CPU can perform other functions that do not involve an access to the shared memory bus, this DMA priority may limit the flexibility of a system. Thus, there exists a need for a improved system having a DMA controller.

SUMMARY

According to an embodiment, a system may have at least one bus, a central processing unit (CPU) coupled with the bus, a memory coupled with the bus, a direct memory access (DMA) controller having a plurality of DMA channels and operating independently from the CPU and being coupled with the bus, wherein for access to the bus the DMA controller is programmable in a first mode to have priority over the CPU and in a second mode in which at least one DMA channel of the DMA controller is suspended from accessing the bus.

According to a further embodiment, the system may further comprise a control register coupled with the DMA controller and for programming the DMA controller, the control register comprising a bit for setting the first or second mode. According to a further embodiment, the first or second mode can be programmable through a control signal fed to the DMA controller. According to a further embodiment, each of the plurality of DMA channels may have an assigned priority level. According to a further embodiment, the DMA controller may comprise for each channel a channel control register. According to a further embodiment, each channel control register may comprise a programmable bit controlling whether the channel is enabled or disabled. According to a further embodiment, the first or second mode can be programmable through a control signal fed to the DMA controller comprising a priority level.

According to yet another embodiment, a method for performing a data transmission over a bus coupled with a master device and a direct memory access (DMA) controller; may comprise the steps of—upon request for a DMA data transmission, granting the DMA controller access to the bus; —programming the DMA controller to suspend the DMA data transmission; —granting the master device access to the bus; —performing at least one bus access by the master device; —programming the DMA controller to resume the DMA data transmission.

According to a further embodiment, the steps of programming the DMA controller can be performed by a configurable register. According to a further embodiment, the steps of programming the DMA controller can be performed by setting and resetting a bit in the configurable register. According to a further embodiment, the steps of programming the DMA controller can be performed by feeding a control signal to the DMA controller. According to a further embodiment, the control signal can be generated from an exception signal fed to the master device. According to a further embodiment, if a data transfer of the data transmission has been initiated by the DMA controller before suspension has been initiated then the system may finish the data transfer and then suspend access of the DMA controller. According to a further embodiment, the master device can be a central processing unit (CPU) and the step of programming is performed by the CPU. According to a further embodiment, the master device can be a peripheral device and the step of programming can be performed by a central processing unit.

According to yet another embodiment, a microcontroller may comprise at least one bus, a central processing unit (CPU) coupled with the bus, a memory coupled with the bus, a plurality of peripherals coupled with the bus, and a direct memory access (DMA) controller operating independently from the CPU and being coupled with the bus, wherein for access to the bus the DMA controller is programmable in a first mode to have priority over the CPU and the plurality of peripherals and in a second mode in which the DMA controller is suspended from accessing the bus.

According to a further embodiment, the microcontroller may further comprise a control register coupled with the DMA controller and for programming the DMA controller, the control register comprising a bit for setting the first or second mode. According to a further embodiment, the first or second mode can be programmable through a control signal fed to the DMA controller. According to a further embodiment, the control signal can be generated from an exception signal fed to the central processing unit. According to a further embodiment, the DMA controller may comprise a plurality of DMA channels. According to a further embodiment, the DMA controller may comprise for each channel a channel control register. According to a further embodiment, each channel control register may comprise a programmable bit controlling whether the channel is enabled or disabled. According to a further embodiment, each channel control register may comprise a programmable bit field for determining a priority of a DMA channel.

According to yet another embodiment, a method for performing a data transmission over a bus coupled with a master device and a direct memory access (DMA) controller having a plurality of DMA channels, may comprise the steps of—assigning each of the plurality of DMA channels a priority level; —upon request for a DMA data transmission, granting the DMA controller access to the bus with one of the plurality of DMA channels; —feeding a suspend command having a priority level to the DMA controller; —if the priority level in the suspend command is higher than a priority level of the DMA channel having access to the bus, then—suspending any DMA channel having a lower priority than the priority level in the suspend command from accessing the bus; and if no other DMA channel has access to the bus, then—granting the master device access to the bus; —performing at least one bus access by the master device; and—feeding a resume command to the DMA controller to resume the DMA data transmission.

According to a further embodiment, the DMA controller can be operable to cycle through multiple DMA channels transactions of DMA channels having the same priority level.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Figure 1:
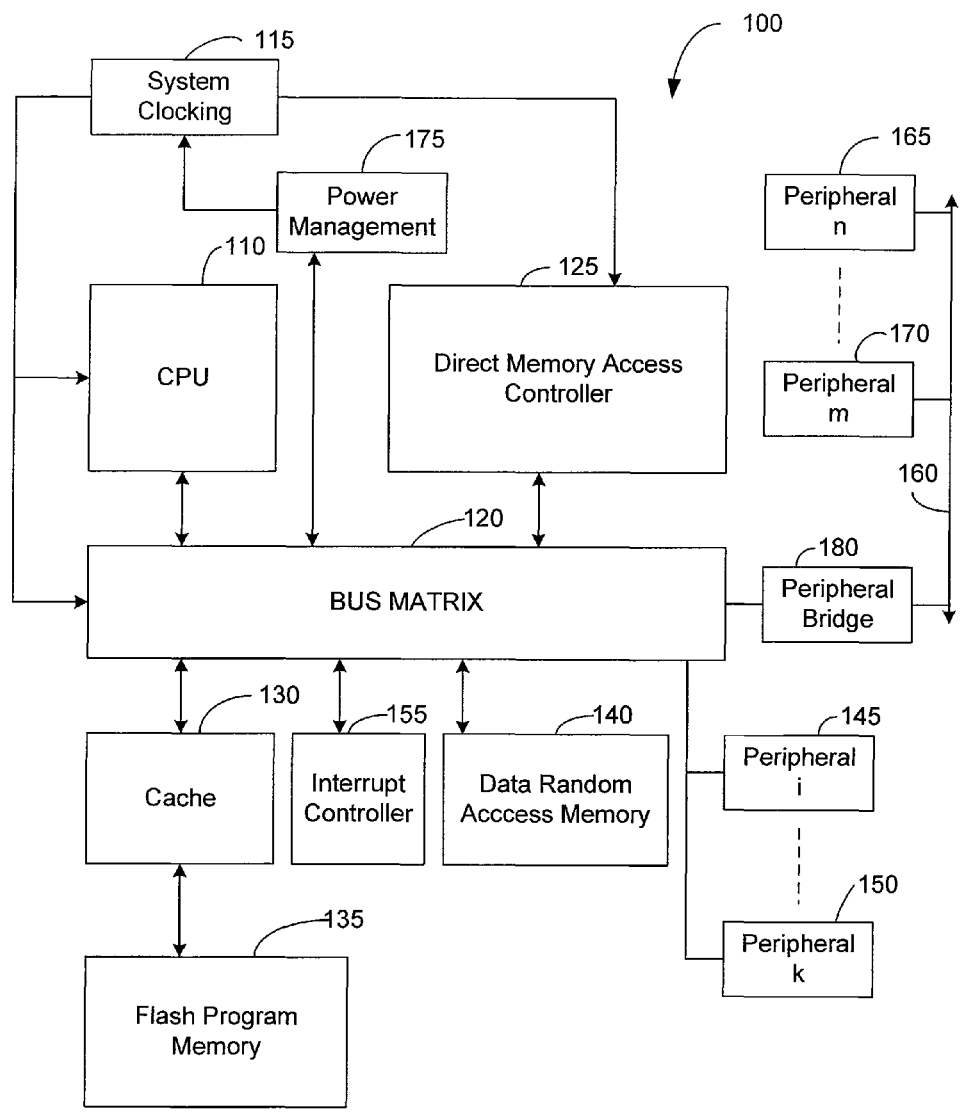
FIG. 1 is a block diagram showing typical DMA controller within a computer system, such as for example, a microcontroller.

According to an embodiment, as stated above a DMA controller and the CPU share the same data and address bus for transferring data to and from the memory. Both, the CPU and the DMA controller may either control the access to a bus. Thus, either the CPU or the DMA controller can be the master. Furthermore, a plurality of peripherals may be configurable to access the bus and become either master or slave on said bus. A system can grant access to the bus on a "first come" priority or using assigned priorities. The "first come" priority scheme grants access to the bus whoever is first in requesting access. All other requesters must wait and will get access sequentially in the order of their request. However, most systems use an assigned priority scheme in which each possible master has an assigned access priority that can override a lower priority. Generally, the DMA controller has the highest priority in such a system. Thus, if the CPU or a peripheral master and DMA controller are actively seeking grant to the bus, the DMA controller has generally priority to access the bus over all other possible master devices. Thus, any activation of a data transfer through the DMA controller will stall the CPU or a peripheral. According to an embodiment, the DMA controller is designed to be programmable in such a way that the CPU can suspend the data transfer of the DMA controller, for example, by setting a bit in a dedicated control register.

However, other control mechanism may be provided to suspend the DMA controller, for example, through a dedicated control line between the CPU and the DMA controller. For example, when the CPU receives an interrupt or other exception, the CPU must change context by pushing data in to a stack in the shared memory. If the CPU provides an exception level signal, the DMA can use that signal to suspend its activity allowing the CPU to save its context faster and gain access to the service routine faster.

A DMA controller may also be allowed to wake up on an event, such as an interrupt, while the central CPU and related logic in a digital device remain in a power-down or sleep mode. This way the DMA logic or the DMA controller may service requests while the CPU and related logic are in a sleep mode. When a buffer count is reached or the end of a transmission is otherwise determined, then the processor is woken up, for example by another interrupt signal, and the CPU exits the power-down mode or sleep mode.

Conventional digital devices currently respond to events by waking the processor core or the whole system and executing respective instructions through a respective interrupt system. This is time consuming and results in more current consumed to power the CPU and program memory in order to execute a service routine before going back to sleep. Waking only the DMA controller, according to an embodiment, to service asynchronous events allows the CPU, program memory, and other components that are not required for the service to remain in the low-power state while the event is serviced. The event is often no more than reading peripheral contents and storing the value into local memory. This can be done by the DMA controller alone. After servicing the event, according to an embodiment, the DMA controller can go back into sleep mode.

A microcontroller or system on a chip may have the following modes which can be implemented through a respectively controlled interrupt system or other appropriate control. In a run mode: All clocks run per respective configuration values to all peripherals and the central processing unit. In this mode, the CPU is active and consumes power. In a first low power mode, the idle mode: The processor clock stops and consumes only standby power, for example, the clock may be gated off. The bus clocks on the bus matrix continue to run. The flash program memory is in standby mode. An interrupt event starts either only the DMA controller or the DMA controller in full speed and the processor clock with a reduced clock. In a second low power mode, the sleep mode: The processor and bus clocks stop. The flash program memory is powered off. An asynchronous interrupt event starts the clocks only for the DMA controller. In other embodiments, more modes can be provided in which only certain devices receive a clock and are, thus, operative.

Conventional technology digital devices do not have the capability of exiting low-power mode without enabling the CPU. According to embodiments described in more detail below, a DMA controller may run from a separate system clock that is pseudo synchronous to the system clock. This clock will be enabled when an external event, such as for example an interrupt, is programmed to wake the DMA. The CPU need not be enabled during this process, which saves power. According to one embodiment, every time the DMA controller completes a transmission, a register storing a number n is increased by 1. Once a predefined number n>=1 of DMA events have been recorded, the CPU may be alerted with an interrupt event. According to an embodiment, the interrupt controller can detect events for peripherals, such as USB or Ethernet and wake them up to, for example, an idle mode, so the peripheral devices can write their buffer in system data random access memory (RAM). Thus, if a DMA event occurs during a sleep mode, only the DMA controller, and the data memory and optionally the respective peripheral switch from a sleep mode to an active mode. Thus, only those system components that are necessary for a DMA transaction are activated upon request and will be deactivated again once the request has been completed.

Turning to the drawings, exemplary embodiments of the present application will now be described. FIG. 1 depicts a typical embodiment of a DMA controller within a computer system, such as a microcontroller 100. The microcontroller 100 generally comprises a central processing unit (CPU) 110 which is coupled to system components and peripherals, for example, via a bus matrix 120. Through bus matrix 120, the CPU 110 can communicate directly with a plurality of peripheral devices i to k 145 . . . 150 and/or through a peripheral bridge 180 with peripheral devices n to m 165 . . . 170. Peripheral devices can be but are not limited to devices, such as I/O ports, memories; A/D and D/A converters, timers; pulse width modulators, etc. An interrupt controller 155 can be provided that controls the interrupt signals used to provide asynchronous start of interrupt routines within the CPU 110. Interrupt signals can be used to interrupt the current execution of an instruction stream and force the CPU 110 to branch to a respective interrupt service routine. Interrupt signals can also be used to control the functionality of DMA controller 125, for example, an activation of a new channel transmission. However, in addition, interrupt signals can also be used to wake up CPU 110, DMA controller 125, and other peripherals. Bus matrix 120 may provide for a dedicated interrupt bus to carry these signals. Interrupt controller 155 may be programmed to mask certain interrupt levels, for example, to prevent certain interrupt signals from interrupting or waking up CPU 110.

Furthermore, a dedicated memory bus can be provided within the bus matrix 120 to couple the CPU 110 with a flash program memory 135 via a cache 130. A data random access memory (RAM) 140 may also be coupled to the CPU 110 via the bus matrix 120. A direct memory access controller (DMA) is shown with numeral 125. This DMA controller 125 is also coupled with the bus matrix 120 to allow for data transfer between the devices coupled with bus matrix 120. Within the bus matrix 120, the DMA unit may be coupled through various busses with memory 140 and peripherals 145 . . . 150, and 165 . . . 170. Furthermore, DMA controller 125 may receive a plurality of control signals from CPU 110 through the bus matrix 120. A system clocking device 115 provides for various clock signals to the CPU and to all units that require a clock either directly or through respective control signals in the bus matrix 120. According to an embodiment, to allow for independent operation of the CPU and the DMA controller, two or multiple independent clock signals are provided for the CPU and the DMA controller. The different clocks may also be provided to other system components through the bus matrix 120. Alternatively, each component within a system may be operable to control its own power mode. To this end, bus matrix 120 may comprise a dedicated power control bus coupled with a power management unit 175 which includes a single or multiple clock signals, power mode signals, and control signals indicating which units are operating in which power mode. However, the power management unit can alternatively control all units directly.

Such a system allows for data transfer by the DMA controller 125 without direct involvement of CPU 110 between any peripheral devices 145 . . . 150, and 165 . . . 170 coupled with bus matrix 120 as well as between those peripheral devices 145 . . . 150, 165 . . . 170 and memory 140 or within memory 140. CPU 110 is usually only needed to initialize DMA controller 125 and to process data once it has been transferred. Once DMA controller 125 is programmed, the data transfer proper is conducted without the aid of CPU 110. CPU 110 is then free to perform other tasks. To this end, a system that performs parallel DMA transfers usually does not change the power management of units associated with the system because, for example, in some cases the CPU 110 may perform an independent function while the DMA controller 125 performs a data transfer. Power management unit 175 allows for a flexible control of the devices. Thus, depending on a power saving mode, different units of the system may be turned off. The power savings modes vary in power consumption from high to low. The CPU 110 is usually active in most power savings modes and may operate at different clocking speeds. Generally only in the highest power savings mode, the CPU 110 will be turned off completely.

According to an embodiment, a system with a CPU 110 and a DMA controller 125 allows for a specific mode in which the DMA controller 125 can be activated separately from the CPU 110 and in which the CPU 110 may at the same time enter different levels of power savings modes from reduced clock speed to complete deactivation. Once the CPU 110 and the DMA controller 125 entered into a higher level power savings mode, such as a static mode in which the CPU 110 and the DMA controller 125 are stopped, according to an embodiment, the DMA controller 125 can independently be activated through a DMA transfer request. Such a request can for example be generated through a respective interrupt signal. Once such a transfer request is received, DMA controller 125 will operate. To this end, if necessary, the power management unit might wake up the DMA controller 125 and one or more requested peripheral devices. However, in one embodiment, the interrupt signal per se can activate the DMA controller 125. The data random access memory 140 may be already active even during a power savings mode but if not could also be re-activated if necessary. Once all units necessary for the respective DMA transfer are active, the DMA controller 125 starts the DMA transfer proper. During this time, the CPU and other devices not necessary for the transaction remain in its respective sleep mode. This can be accomplished by, for example, masking the interrupt levels in such a way, that a respective interrupt level only activates the DMA controller 125 and not CPU 110. DMA controller 125 monitors and controls the transfer and sends a signal either directly or through power management unit 175 to CPU 110 which will wake up CPU 110. For example, in one embodiment, DMA controller 125 can generate an interrupt with a level high enough to wake up CPU 110 upon completion of a DMA transmission. Thus, CPU can then further process the data that has been transferred. Once CPU 110 is done with any necessary processing, CPU 110 can again enter a respective power saving mode. Also, after the DMA controller 125 has serviced the DMA request it can re-enter a sleep or low power mode. In one embodiment, the wake-up process for CPU 110 is only initiated if a predetermined number of DMA transmissions has been completed. To this end, a respective register is provided that is increased by 1 every time a DMA transmission has been completed. An interrupt signal for waking up CPU 110 may only be generated if the content of this register is higher or equal than a predefined number n>=1.

In yet another embodiment, a special register may comprise an address or data that initiate the activation of CPU 110. This embodiment is useful, if the transition of CPU 110 from a sleep mode to an active mode requires a significant amount of time. Thus, an intermediate address which is set to a predefined number of memory places between the start and the end address of the transmission may trigger the re-activation of CPU 110. Thus, whenever the DMA transfer has been completed, the CPU will be active without any further delay caused, for example, by an oscillator start-up time. Instead of a special register, a bit field in a control register may be used to define an offset from the end address which may be used to generate a wake up signal before the DMA transmission has been completed.

Figure 2:
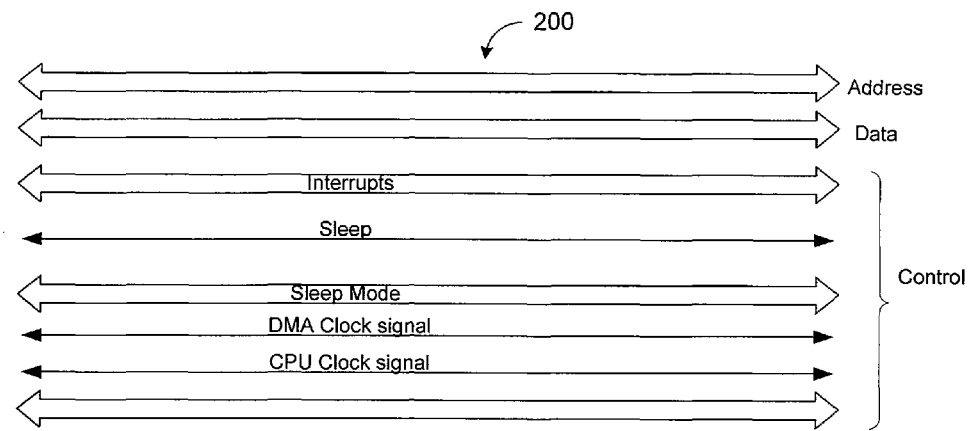
FIG. 2 illustrates an exemplary bus used in a bus matrix.

FIG. 2 shows some bus signals of a bus 200 used within the bus matrix 120. For example, a bus may include the usual address and data signals as well as a plurality of control signals. The control signals may include amongst a plurality of control signals, as shown, a plurality of interrupt signals for defining different interrupt signals with different priorities/levels, a specific signal for indicating a sleep mode and associated mode signals indicating what type of sleep mode is to be entered. Other signals indicating which units should enter a respective sleep mode can be included. FIG. 2 also shows an example of a dedicated CPU clock signal and a separate DMA clock signal which can be used in system in which specific units cannot be individually assigned different power modes. The bottom control lines indicate other control signals that are usually implemented in a microprocessor or microcontroller.

Figure 3:
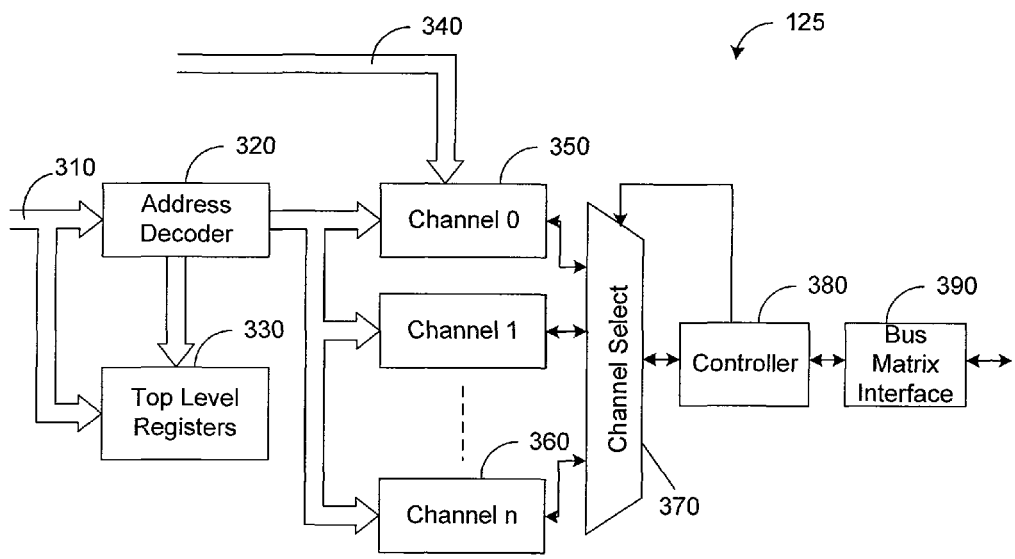
FIG. 3 is a block diagram showing a details of a first embodiment of a DMA controller.

FIG. 3 shows an embodiment of a DMA controller. A plurality of DMA channels 350 . . . 360 is provided and controlled by control bus 340 such as an interrupt request control bus. The DMA channels 350 . . . 360 are coupled with bus 310 to receive data and addresses. An address decoder 320, in particular, receives addresses 320 and compares with respective control registers 330 to control the functionality of the DMA transfers. A multiplexer 370 can be used to control the output of the respective channels 350 . . . 360. Controller 380 controls the multiplexer 370 and, thus, the data flow through the following bus matrix interface 390. The embodiment shown in FIG. 3 may be controlled by respective interrupt signals. For example, an interrupt signal may be used to initiate a transfer through a respective channel. To this end, each channel may be assigned a respective interrupt level. A subset of interrupt levels can be used and DMA controller 125 may be programmable to assign certain interrupt levels to the respective transfer channels. Furthermore, DMA controller may be programmable to generate a plurality of interrupt signals upon completion of a transmission, reaching a certain point in a transmission, such as a transfer of half of a channel buffer, reaching of a predefined point within a channel buffer, or match of a predefined data pattern to be transferred. Other interrupt control signals can be implemented.

Figure 4:
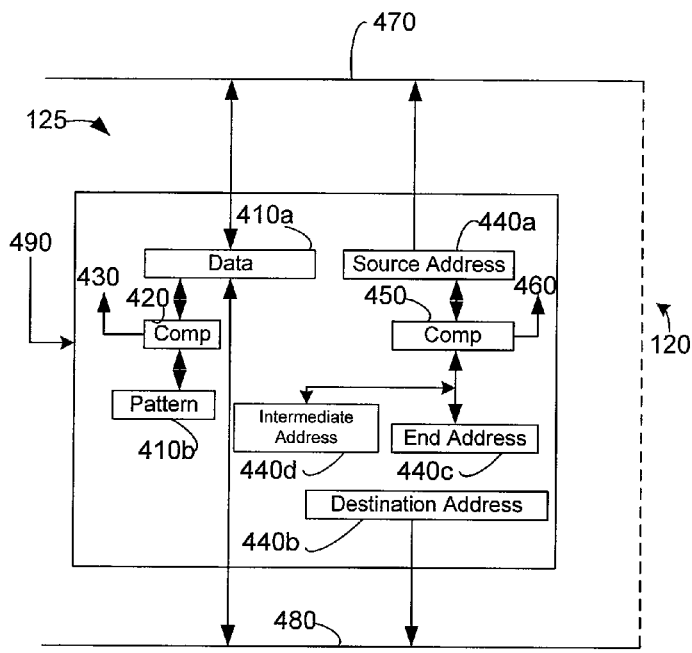
FIG. 4 is a block diagram showing a details of a second embodiment of a DMA controller.

FIG. 4 shows more details of an embodiment of a channel within a DMA controller 125. According to one embodiment, a DMA controller 125 may have a static design and thus may receive its own DMA clock signal 490 which can be used to control different power modes directly, for example, in a high power mode, the device would receive the highest clock speed, in the lowest power mode no clock signal at all, and intermediate power modes may comprise various intermediate clock speeds. DMA controller 125 may comprise programmable gates that receive the clock signal and may block the clock signals upon entering a sleep mode and open the gates upon receipt of an interrupt wake up signal. DMA controller 125 further comprises at least a data register or latch 410*a* and an associated address register or latch 440*a*, *b* both coupled with a receiving bus 470 and a transmitting bus 480 within bus matrix 120. FIG. 4 indicates by the dotted line that receiving bus 470 and transmitting bus 480 can be one and the same, such as bus 200 shown in FIG. 2. However, in another embodiment, DMA controller 125 can also be configured to communicate between two different buses. In such an embodiment, a receiving bus 470 can be, for example, bus 310 as shown in FIG. 3 and a transmitting bus 480 can be another bus connected to bus matrix interface 390 as shown in FIG. 3. Both registers or latches for address and data 410*a* and 440*a*, *b* are coupled with these buses. Alternatively separate registers for transmitting and receiving can be utilized. Separate address registers 440*a* and 440*b* as shown in FIG. 4 are useful as source and destination address usually differ. The data register 410*a* and the transmitting and/or receiving register 440*a*, *b* may further be coupled with a comparator 420, 450 to determine a match in the data or address.

During a DMA data transfer, the DMA controller 125 can be programmed to transfer a specific amount of data beginning at a source start address and ending at a source end address to a destination which also begins at a destination start address and ends at a destination end address. To this end, for example, register 440*a* is loaded with the source start address and register 440*b* is loaded with the destination start address. DMA controller 125 further receives either the length of the data block to transferred or a source end address. If the source end address is used, then this address is loaded in a respective register 440*c* coupled with a comparator unit 450. Alternatively, the destination end address or as stated above, the length of the data block can be used to determine the end of the transfer. Once such an exemplary initialization has been conducted, the data transfer proper takes place. DMA controller 125 further may comprise another register 440*d* which can be used to define a specific intermediate address for generating a signal that the transfer has reached a certain point. To this end, this register 440d can be preset with an address indicating the middle point of a transfer buffer or any other point within the buffer. Comparator unit 450 may comprise a group of comparators or may be configured to generate separate signals upon comparison of the different register contents. The comparator output signals may be used to generate specific interrupt signals.

In the following a transfer using a single bus is explained. DMA controller 125 puts the first address, the source start address stored in register 440a on the bus. This address can be within a memory or any device coupled with the bus. An associated data is then transferred into data register 410a. In a following step, register 440a is decoupled from the bus and register 440b is coupled with the bus. Alternatively, if only one address register is used, this address register is loaded with the destination start address. Thus, the destination address is now put on the bus addressing the respective destination such as a memory or any device coupled with the bus. Then, the data stored in register 410a is transferred to this destination address. Source address register 440a and destination address register 440b are then incremented and the process is repeated until the source address register 440a contains the source end address. This end of transmission can, for example, be detected by comparator 450 which compares the contents of address register 440a and register 440c. Register 440d may be used to generate intermediate signals indicating that a certain status/time of the transmission has been reached.

In addition, DMA controller 125 allows for a conditional transfer that stops the transfer once a specific pattern such as a predefined data byte has been received. To this end, DMA controller 125 comprises a further pattern register 410b. Upon initialization, this register 410b is loaded with a pattern such as a specific byte. Once comparator 420 detects a match between the loaded data in register 410a and the pattern register 410b a respective signal 430 is generated which indicates to DMA controller 125 that the end of transmission has been reached. To prevent an endless transmission, the address comparator 450 can be used in addition to define a maximum transfer.

Thus, the DMA controller 125 according to such an embodiment generally allows two different types of transactions. A first transaction is defined as a fixed length transmission allowing for a defined block of data to be transferred by the DMA controller. The second transaction has an open length and its length is defined by a specific pattern. For example, the end of transmission can be defined by a specific symbol. Moreover, in another embodiment, a sequence of symbols may define the end of transmission. Thus, a more flexible definition of an end of transmission is possible. For example, instead of a single byte a sequence of two bytes can be used such as a carriage return (CR) line feed (LF) sequence. To this end, a plurality of registers can be provided which are programmed with the respective sequence. The second transaction type can be enhanced with a maximum transfer length to avoid an endless transfer loop and thus provide for additional security.

Figure 5:
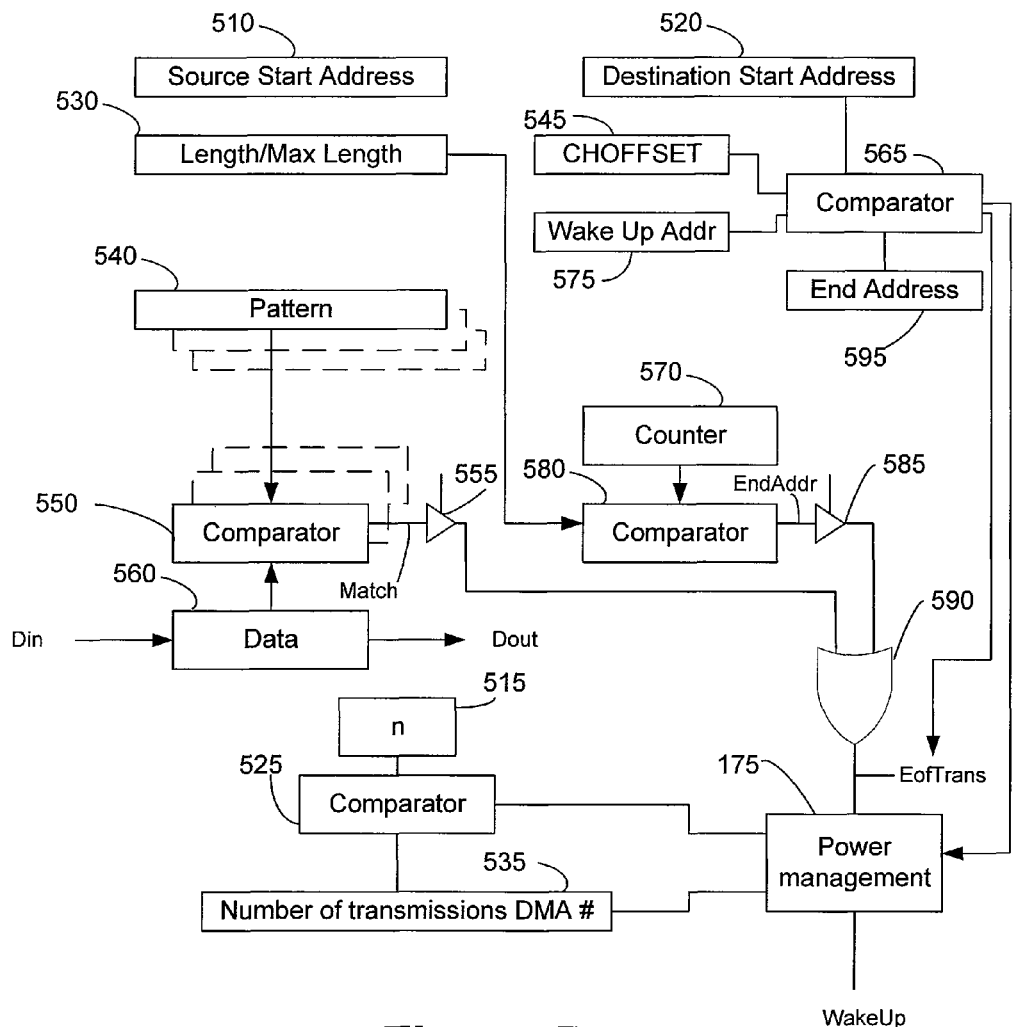
FIG. 5 is a block diagram showing details of a second embodiment of a DMA controller.

FIG. 5 shows another exemplary embodiment of a DMA controller 125. In this embodiment, a source register 510 and a destination address register 520 are provided. Furthermore, a length/maximum length register 530 is coupled with a comparator 580 which can generate an end address detection EndAddr. Comparator 580 is furthermore coupled with a counter 570. A pattern register 540 is coupled with another comparator 550 which is also coupled with a data register 560 receiving and transmitting the data proper $D_{in}$ and $D_{out}$. Comparator 550 generates a signal Match which can then produce an end of transmission signal EofTrans. Multiple pattern registers 540 and associated comparators can be provided as indicated by respective elements using dotted lines. Respective logic between the registers and the comparators can be provided to allow for the different types of transmissions. As an example, FIG. 5 shows a first controllable driver 585 receiving the signal EndAddr from comparator 580. The output of driver 585 is coupled with a first input of an OR gate 590. A second controllable inverter 555 receives signal Match from comparator 550. The output of driver 555 is coupled with the second input of OR gate 590. Thus, the output of OR gate 590 provides for an end of transmission signal EofTrans. This signal can be used to control a data transfer. Furthermore, this signal can be fed to a power management unit 175.

Alternatively, comparator unit 565 is provided to compare the content of either source or destination address registers 510, 520 with end address register 595 to directly generate an end of transmission signal EoTrans. In yet another embodiment offset register 545 is provided the content of which is used to subtract an offset from the end address register 595 to generate an independent early wake up signal as will be explained in more detail below. As a further alternative, wake up address register 475 is used instead of offset register 545. In this embodiment, the end of transmission signal EoTrans is generated by comparison of either source or destination address register 510, 520 with end address register 595 and the wake up signal WakeUp by comparison of either source or destination address register 510, 520 with wake up address register 575.

According to another embodiment, in addition, control registers 515 storing a predefined programmable number n and a register 535 which acts as a counter and counts the number of transmissions performed by the DMA controller may be provided. The content of both registers are compared by comparator 525 and the result is fed to power management unit 175. Register 515 stores the integer n which is programmed by a user through CPU 110. Upon setting the system into sleep mode, register 535 is reset to DMA#=0. If a DMA request is received during sleep mode, the DMA controller and respective devices necessary for the DMA transmission are re-activated. If a transmission has been completed, register 535 and, thus, DMA# is incremented. Comparator 525 compares the contents of register 515 and 535 and sends a result to power management unit 175. If DMA#>=n, then power management unit 175 generates the wake-up signal. Otherwise, DMA controller 125 is put back into sleep mode until the next DMA request arrives.

The DMA transmissions can be performed in different modes. In a first mode, driver 555 is controlled to decouple comparator 550 from OR gate 590 generating a constant logic low signal at the second input of OR gate 590 and driver 585 is controlled to couple comparator 580 with OR gate 590. Register 510 and 520 are loaded with the respective source start address and destination start address. Register 530 is loaded with the length of the data block to be transmitted and counter 570 is reset to zero. Then the data transfer can be started. To this end, the data addressed by register 510 is loaded into register 560 and written to the address contained in register 520. Then, registers 510 and 520 are incremented by the size of the transmitted data. For example, if data register is a byte wide register, then registers 510 and 520 are incremented by 1. If data register is a 16 bit register, then registers 510 and 520 are incremented by 2, and so on. Counter 570 is incremented accordingly. Comparator 580 is comparing the counter value of counter 570 with register 530. The transfer of data is repeated until the counter value matches the content of register 530. If such a match is reached, the EndAddr signal goes logic high and the output of Or gate 590 will go high indicating an end of transmission EofTrans. As a result, the DMA controller is stopped.

In a second mode, driver 585 is controlled to decouple comparator 580 from OR gate 590 generating a constant logic low signal at the first input of OR gate 590 and driver 555 is controlled to couple comparator 550 with OR gate 590. In this mode, again source and destination registers 510 and 520 are loaded with the respective start addresses. In addition pattern register 540 is loaded with predefined pattern. Again, the DMA transfer is started and the first data associated with the source register is loaded into data register 560 and compared with pattern register 540. If a match occurs, comparator 550 generates a high signal at its output which causes a high signal at the output of OR gate 590 and indicates the end of the transmission. Otherwise, registers 510 and 520 are incremented and the transfer continues until a match between the transmitted data and the pattern register 540 occurs. In a third mode, both drivers 555 and 585 are activated coupling both comparators 550 and 580 with OR gate 590. In this mode, registers 510 and 520 are again loaded with the respective start addresses. Furthermore, a maximum length value is loaded into register 530 and a pattern is loaded into register 540. The data transfer takes place as described above. However, the end of transmission is either generated by comparator 550 or 580.

All DMA transfer modes may be executed while CPU 110 is active or suspended or in a sleep mode while DMA controller 125 and the respective peripheral devices are active. Power management unit 175 is then used to control the further process. To this end, the EofTrans signal can also be forwarded to the power management unit 175. Power management unit 175 may comprise a respective register which can be programmed to generate a wake-up signal which is sent to CPU 110 depending on the number of DMA transmissions as stated above, or dependent on the channel, peripheral, etc. Thus, in a programmed mode in which CPU 110 has to immediately process data of a specific DMA transfer, in case CPU 110 was in a sleep or suspended mode, power management unit 175 will wake up CPU 110 upon completion of the respective DMA transfer. Once CPU 110 has completed its data processing and if requested, CPU 110 can again enter the sleep or suspended mode according to its further programming. Similarly, DMA controller 125 is put back into a respective sleep mode once all pending transmissions have been completed.

In addition, when CPU 110 and DMA controller 125 are both active, usually the DMA controller 125 has priority to any bus access. Thus, while transferring data on a bus, CPU 110 is prohibited from accessing the same bus and therefore stalled. The same is true for a peripheral that can be become master on the bus. However, it is sometimes important that the CPU or another peripheral is allowed to access a bus which is currently used by DMA controller 125. To allow for such an access, the DMA controller is programmable via a register to be suspended from a current transfer. To this end, CPU 110 can set a dedicated bit within the DMA controller indicating to the DMA controller 125 that the DMA controller 125 is to suspend its current transfer until CPU 110 resets the respective bit. Instead of using a dedicated bit within a control register, as stated above, a dedicated control line can be used to suspend DMA controller from a current data transmission. Moreover, a priority scheme can be used in which each DMA channel and/or associated DMA unit can be assigned to a specific priority level. A suspend signal may comprise a specific priority level. Thus, only those channels below the specific priority level will be suspended upon request by the CPU.

Thus, upon detection of a suspend signal, DMA controller 125 finishes the current data transfer, i.e. a single data transfer using data register 410a/560 that has been started before the detection of the suspend bit/signal is completed. In another embodiment, an already started data transfer is aborted without completing it. After completion or abortion of such an already started transfer, DMA controller is suspended from any further transfers but keeps its current status stored. In other words, all register contents are maintained while DMA controller is in a suspended mode. If a data transfer has been aborted, DMA controller is reset to the respective status before the transfer abortion to be able to repeat the aborted transaction. During the suspended mode, DMA controller relieves any blocking of the bus used to transfer data. In case of a priority scheme only those DMA transactions that have a higher priority than the suspend priority will be completed and then, DMA controller switches into the suspended mode. Thus, CPU 110 or the peripheral is now allowed to have full access to the respective bus and can transfer the necessary data. Upon completion of the respective transfer, CPU 110 may release DMA from the suspended mode by resetting the respective bit in the control register or by deactivating the respective control signal or by sending a suspend command with the lowest priority. This mechanism allows for a more flexible control of the access to the busses within a system. Thus, if a certain program requires immediate attention by the CPU or a peripheral, the CPU can in a controllable way suspend the DMA controller from a current transmission that blocks the CPU and the CPU or the peripheral can perform the necessary access.

Figure 6A:
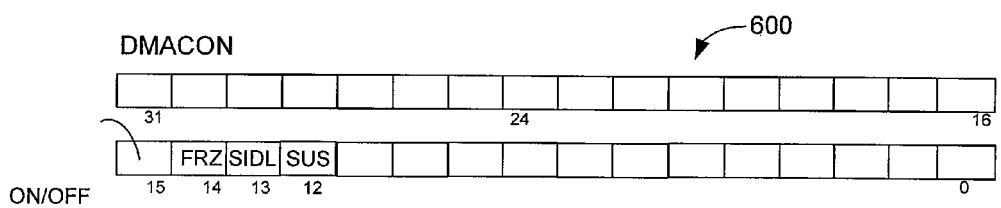
FIGS. 6A and 6B illustrates typical registers used to control certain aspects of a system with a DMA controller according to an embodiment.
Figure 6A:
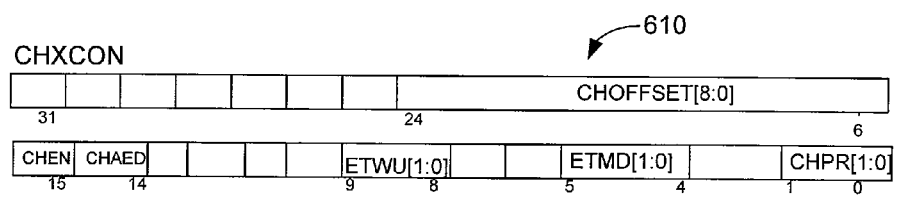
Figure 6B:
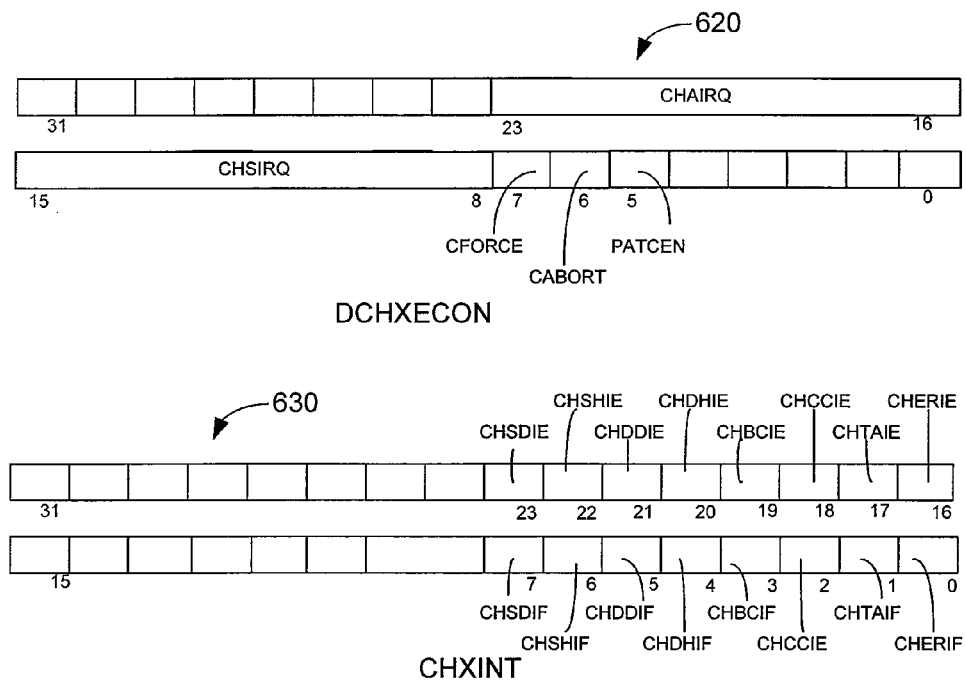

FIGS. 6A and 6B show certain control registers used for the channels of a DMA controller 125. For example according to FIG. 6A, register 600 DMACON is used to control general functions of a DMA controller. Bit 15 is used to activate or deactivate DMA controller 125. Through this bit, the DMA module may be enabled or disabled. Bit 14 is used to "freeze" the DMA during a Debug mode when set or allow DMA transfers during a Debug mode when not set. Bit 13 is used to freeze transfers during a sleep mode when set and to allow transfers during sleep mode when not set. Bit 12 is used to dynamically control suspension of DMA controller 125 as stated above. To this end, bit 12 can be set to "1" to suspend a DMA transfer and allow the CPU uninterrupted access to the bus. When bit 12 is reset to "0," DMA controller 125 operates normally which will give DMA controller priority over the bus, thereby stalling or interrupting any access by the CPU. An priority mechanism may automatically suspend those DMA channels that have a lower priority than a suspend command. The priority scheme can also be implemented via an interrupt mechanism.

Register 610 CHXCON controls the individual channels X. As each data transmission may consist of a plurality of transactions, bits 0 to 1 CHPR[1:0] may be used to define a priority assigned to each channel. In this embodiment, DMA controller 125 may have a number of channels, for example, 4 or 8 channels. The 2 bits are capable of defining 4 different priorities. If more priorities are necessary, according to an embodiment, bit field CHPR could be enlarged to provide for the respective amount of bits. The priority assignment is used to determine the order in which multiple channel transactions will be executed. For example, if channel 0 has the highest priority and all other channels have a lower priority then all transactions for channel 0 will be executed until an EofTrans signal has been generated for this channel and the data transmission has been completed. If multiple channels have the same priority, the controller will cycle through all that channels at that priority. Thus, if channels 2 and 3 have the same priority and no higher priority exists, after one transaction for channel 2 the controller switches to channel 3 to perform one transaction for this channel and then switches back to channel 2, and so on until all transactions for these two channels have been completed. If a channel with a higher priority requests a transfer while another channel of lower priority has a transaction pending, the transaction will complete before moving to the channel with the higher priority.

Figure 10:
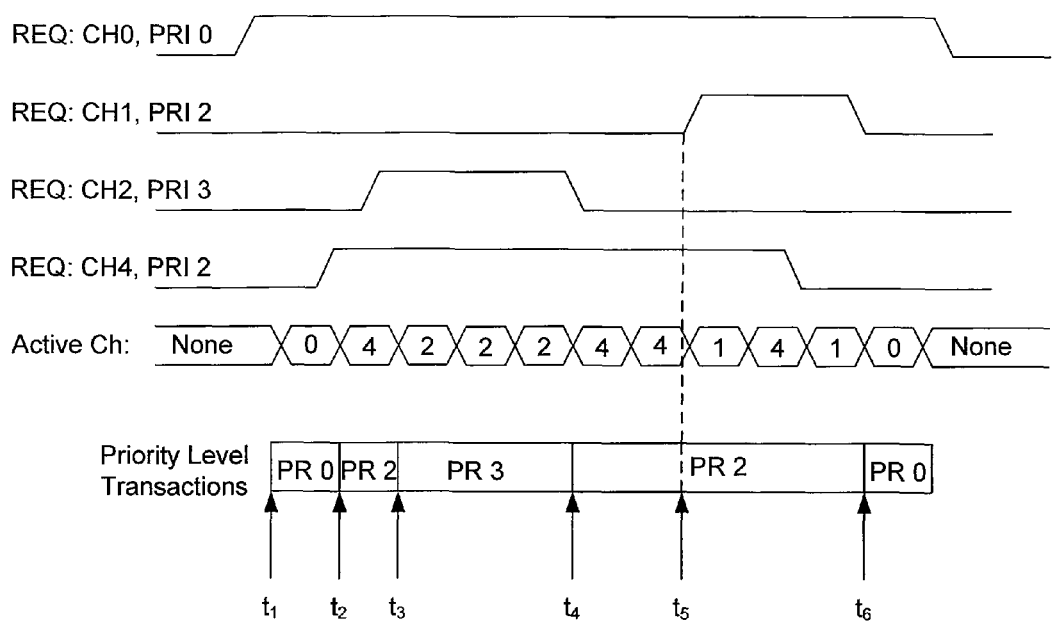
FIG. 10 shows a timing diagram of a multiple channel transfer.

FIG. 10 shows an example of a multiple channel transfer in a system with 8 channels in which channels 0, 1, 2, and 4 are active. Channel 0 first requests a transfer by asserting its respective control line. At this time $t_1$ no transaction is pending. Thus, a transfer transaction starts with the next cycle as indicated in the line "Active CH:" which identifies the currently active channel. During the transfer for channel 0, channel 4 requests a transfer. Because channel 4 has a higher priority than channel 0, at the next cycle time $t_2$, a transfer transaction for channel 4 is started. During the transfer for channel 4, channel 2 requests a transfer. Because channel 2 has a higher priority than channel 4, at the next cycle time $t_3$, a transfer transaction for channel 2 is started. While sequential transfer transactions for channel 2 are executed, transfers for channel 0 and 4 are suspended. At time $t_4$, all transfers for channel 2 are completed and the controller resumes transfers for channel 4 which at this time has the highest priority. At time $t_5$, channel 1 requests a transfer wherein channel 1 has the same priority as channel 4. Thus, the controller will from now on cycle through channel 1 and channel 4 transfers until their transmissions have been completed or a higher priority request is received. In the example shown in FIG. 10, at time t6 the transmissions for channel 1 and 4 are completed. Thus, the controller resumes with the next transfer transaction for the remaining channel 0. At any time a suspend command with a certain priority level can be received by the DMA controller. Then, only those channels with a higher priority are allowed to proceed with their transaction. This way, a very flexible suspend mechanism can be implemented within the DMA controller that allows to selectively suspend certain or all DMA channels.

Referring back to FIG. 6A register CHXCON, bits 4 to 5 ETMD[1:0] are used to define a mode of operation. For example, 4 different modes can be assigned. Thus, these bits allow to define, for example, the three modes described with respect to FIG. 5.

Referring back to FIG. 6A register CHXCON, bits 8 (and 9) ETWU is (are), for example, used to define whether a wake-up signal is generated when a transmission has been completed. If a respective bit is set, the power management unit 175 may receive this signal, for example, from OR gate 590 as illustrated in FIG. 5 and generate the respective wake up signal for CPU 110. As an alternative a bit field ETWU [1:0] as shown in FIG. 6, may be used with two or more bits to define an interrupt level of an interrupt signal that will be generated once a transmission for a respective channel has been completed. In such a case, for example, the output signal of OR gate 590 would be used to generate the interrupt signal. CPU 110 could be programmed to only wake up if an interrupt with a certain priority level is received. In other words, during a sleep mode, certain lower priority interrupts would be masked. Such a method would allow for a simple design of the wake up mechanism. DMA transmissions that are not supposed to wake up CPU 110 would be assigned a lower level priority whereas DMA transfers which require the CPU to process the transmitted data would be assigned a higher priority to wake up CPU 110.

Bit 14 CHAED is used to allow registration of channel start/abort events when set even if the channel is disabled. Bit 15 CHEN is used to individually enable a respective channel when set. Thus, channels transfers can be individually suspended using these bits.

Referring back to FIG. 6A, bits 16 to 26 CHOFFSET[8:0] indicate an offset to generate the wake up signal earlier than the completion of the DMA transfer. For example, in a DMA memory transfer each transaction requires a known time t1. If the activation time delay for CPU 110 is 25×t1, then bit field CHOFFSET can be programmed to 25. A respective comparator 565 and register 545 may be provided that compare the destination address minus the offset with the actual source address as indicated in FIG. 5. The result of the comparison is independent from the end of transmission signal and fed to power management unit 175.

FIG. 6B illustrates another register 620 DCHXECON which can be implemented for each channel that controls the interrupt functionality of each channel. To this end, bits 16-23 define a bit field CHAIRQ which can be programmed with an interrupt level. An interrupt higher than the programmed level will cause an abort of the respective channel transfer. Bits 8-15 define bit field CHSIRQ and is used to define an interrupt level that will cause the start of a DMA transfer for that channel. Bit 7 CFORCE can be used to force a DMA transfer to start when set to "1." Bit 6 CABORT can be used to abort a specific transfer when set to "1." Bit 5 PATCEN may be used to set the pattern match functionality. Thus, a transfer will be aborted upon a pattern match as described above when this bit has been set to "1."

FIG. 6B shows yet another register 630 CHXINT used to control certain functions in an interrupt controlled DMA system. This register may be used to program the generation and functionality of certain interrupt signals. Bit 23 CHSDIE enables an interrupt indicating when a channel source buffer is done. Bit 22 CHSHIE enables an interrupt indicating when a channel source buffer is half empty (reaching the center of the buffer). Bit 21 CHDDIE enables an interrupt indicating when a channel destination buffer is done. Bit 20 CHDHIE enables an interrupt indicating when a channel destination buffer is half empty (reaching the center of the buffer). Bit 19 CHBCIF is used to enable an interrupt that indicates the completion of a block transfer. Bit 18 CHCCIE is used to enable an interrupt that indicates the completion of a cell transfer. Bit 17 CHTAIE is used to enable an interrupt for a transfer abort. Bit 16 CHERIE is used to enable an interrupt for a channel address error. Bit 7 CHSDIF is an interrupt flag bit indicating that channel source buffer pointer has reached the end of the source buffer. Bit 6 CHSHIF is an interrupt flag bit indicating that channel source buffer pointer has reached the midpoint of the source buffer. Bit 5 CHDDIF is an interrupt flag bit indicating that channel destination buffer pointer has reached the end of the destination buffer. Bit 4 CHDHIF is an interrupt flag bit indicating that channel destination buffer pointer has reached the midpoint of the destination buffer. Bit 3 CHBCIF is an interrupt flag bit indicating that a block transfer has been completed. Bit 2 CHCCIF is an interrupt flag bit indicating that a cell transfer has been completed. Bit 1 CHTAIF is an interrupt flag bit indicating that an interrupt matching CHAIRQ has been detected and the DMA transfer has been aborted. Bit 0 CHERIF is an interrupt flag bit indicating that a channel address error has been detected. In the embodiment described above, a cell transfer describes the number of bytes transferred when a DMA channel has a transfer initiated before waiting for another event. Thus, a cell transfer comprises a programmable number of single word transfers, wherein each single word transfer may consist of up to 4 bytes in a 32 bit system. A block transfer is defined as the number of bytes transferred when a channel is enabled. The number of bytes can be the larger of either the source size or the destination size which can be programmed independently. A block transfer, thus, comprises one or more cell transfers.

Figure 11:
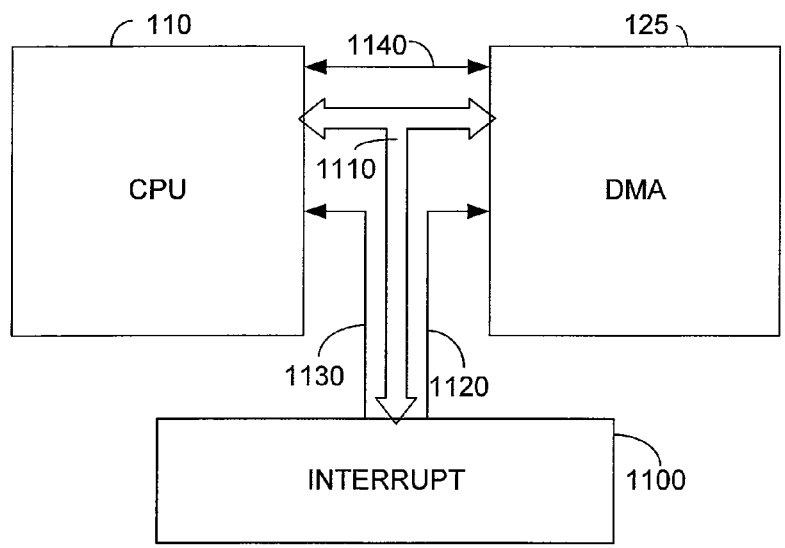
FIG. 11 illustrates a system with a DMA controller using interrupts to control the functionality of the system.

FIG. 11 shows an embodiment of a system with a CPU 110, a DMA controller 125 an interrupt controller 155 and dedicated control signals, such as interrupt bus 1110, individual interrupt lines 1120, 1130, and 1140. In one embodiment, interrupt bus 1110 can be used to generate the different interrupt signals as described above. Interrupt controller 155 is used to control these interrupts. However, in other embodiments, direct connections such as interrupt line 1140 may be used between DMA controller 125 and CPU 110. Moreover, further individual interrupt signals 1120 and 1130 may be used and generated by interrupt controller 155. However, interrupt bus 1110 may be implemented, for example use a single interrupt signal that is fed to all units and a plurality of control lines to indicate a respective interrupt level. Using a plurality of registers, as for example, described above allows for a very flexible control of the system including a CPU 110 and a DMA controller 125. According to an embodiment, a DMA channel will transfer data from a source register to a destination register without CPU intervention. The Channel Source Buffer Start Address register defines the start address of the source buffer. The Channel Destination Buffer Start Address register defines the start of the destination buffer. Both, the source and destination buffers are independently configurable using respective registers. A cell transfer may be initiated by either software that sets a respective bit CFORCE or by an interrupt event that matches the programmed CHSIRQ interrupt level. A DMA transfer will perform a cell transfer when initiated. According to an embodiment, the channel remains enabled until the DMA channel has transferred the larger of the source or destination buffer. Each channel keeps track of the number of words transferred from the source and destination buffers, using buffer pointers. Buffer interrupts can be generated when the source or destination pointers is half of the buffer size or when the source or destination counter reaches the end of the buffer. According to different embodiments, interrupts can be controlled by an interrupt controller 155 and can be managed individually or through a dedicated interrupt bus allowing for a plurality of priority levels.

As stated above, a user can also immediately suspend the DMA module 125 by writing the suspend bit SUS (See FIG. 6A). This will immediately suspend the DMA from any further bus transactions. This function can be implemented to allow the CPU to have full bus access. The DMA will typically be suspended when the CPU requires complete control of the bus for atomic instruction sequences such as the unlock sequence of an non-volatile memory module.

Individual channels may be suspended using the CHEN bits (See FIG. 6A, register 610). If a DMA transfer is in progress and the CHEN bit is cleared, the current transaction will be completed and further transactions on this channel will be suspended. Clearing the enable bit CHEN will not affect the channel pointers or transaction counters. While a channel is suspended the user can elect to continue to receive events such as abort interrupts by setting the CHAED bit (See FIG. 6A, register 610). As stated above, a priority scheme can also be used to individually suspend certain DMA channels.

Figure 7:
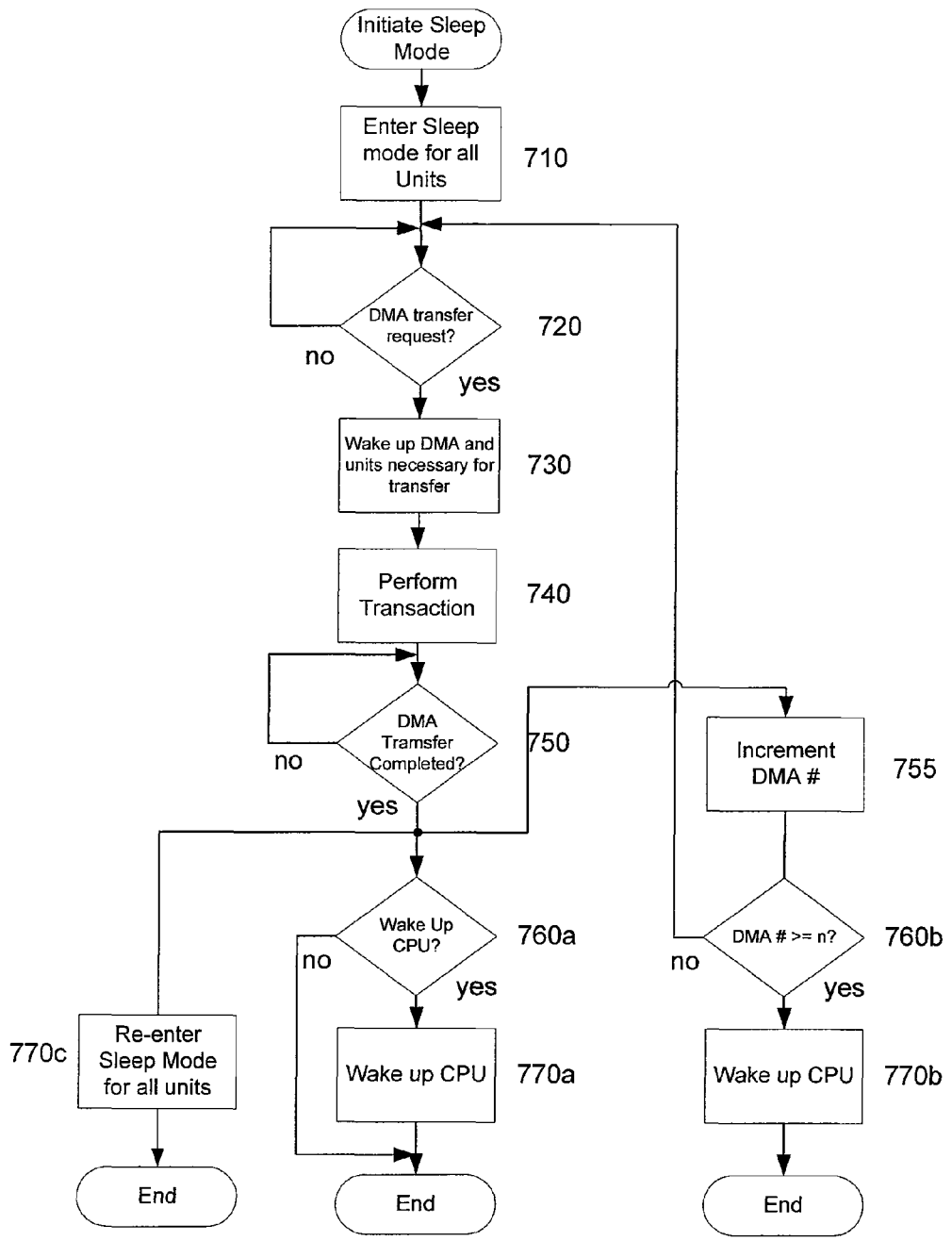
FIG. 7 shows a flowchart of a system control routine according to an embodiment.

FIG. 7 shows a flow chart of an embodiment of a sleep mode of a system with a DMA controller according to an embodiment. In a first step 710, all units that may enter a sleep mode including CPU 110 are de-activated to reduce the power consumption to a minimum. In step 720 DMA controller checks whether a DMA transfer request has been received. If interrupt driven, a polling for such a request is not necessary and the routine will be executed as an interrupt service routine. Alternatively, the DMA controller may also be in a sleep mode and a DMA transfer request or interrupt will wake up the DMA controller. If necessary, in step 730 all units that are required for the DMA transmission will be activated through respective wake-up signals. In step 740 the DMA transfer is started and the first transaction is performed. In step 750, the DMA controller checks whether the transmission has been completed. If not, then the routine returns to step 740 to perform another transaction. If the transmission has been completed, then after step 750, the routine may operate in different ways.

According to a first embodiment, the routine continues with step 760*a* in which it is checked whether to wake up CPU 110 or not. If, for example, the respective bit in the respective channel control register has been set, then CPU 110 will be activated in step 770. Otherwise, the routine skips step 770. As an alternative, to steps 760 and 770, an interrupt signal with a previously assigned interrupt level may be generated after completion of the transmission.

According to a second embodiment, the routine continues with step 755 in which the register DMA# is incremented. Then, in step 760*b* it is checked whether DMA#>=n to determine whether to wake up CPU 110 or not. If, for example, the number of completed transmissions is lower than a predetermined number n, then CPU 110 will not yet be activated and the routine skips step 770. Combinations of the above determination steps are of course possible and can be implemented according to the required system design.

According to a third embodiment, the routine continues with step 770*c* in which all devices re-enter the respective sleep mode they had before the transaction started.

Figure 8:
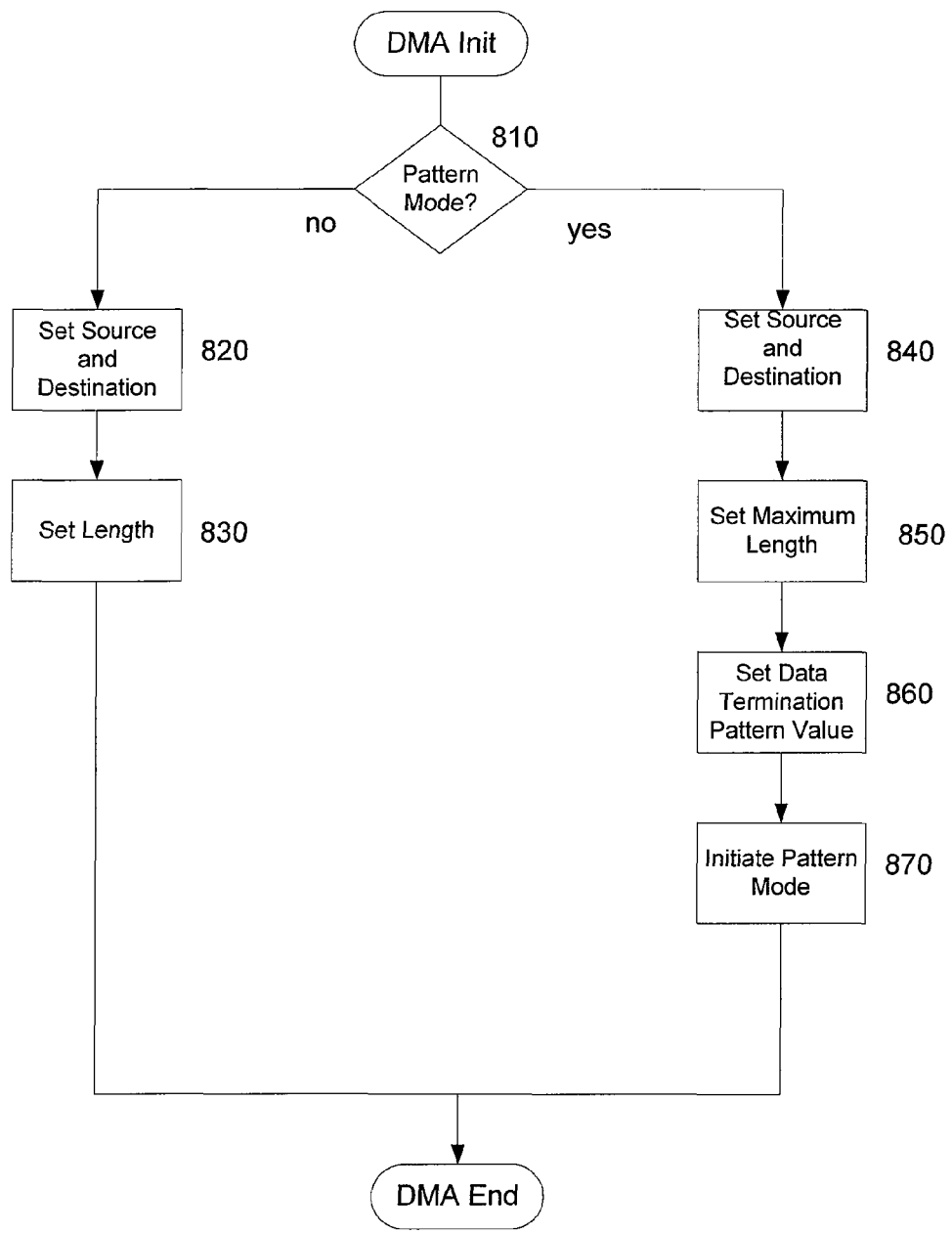
FIG. 8 shows a DMA initialization routine.

FIG. 8 shows a flow chart of an embodiment of an initialization routine for a DMA controller. In a first step 810 a decision is made whether a pattern mode is used or not. If no, the routine branches to step 820 in which the source and destination address are stored. In a following step 830 the length of the transmission is determined either by an end address or a block length. Then the routine ends. If the pattern mode is used, the routine goes to step 840 in which the source and destination are set. Then in step 850, optionally the maximum length of the transmission is set and in step 860 the data termination pattern value is stored. In step 870 the pattern mode is set and the initialization routine ends.

Figure 9:
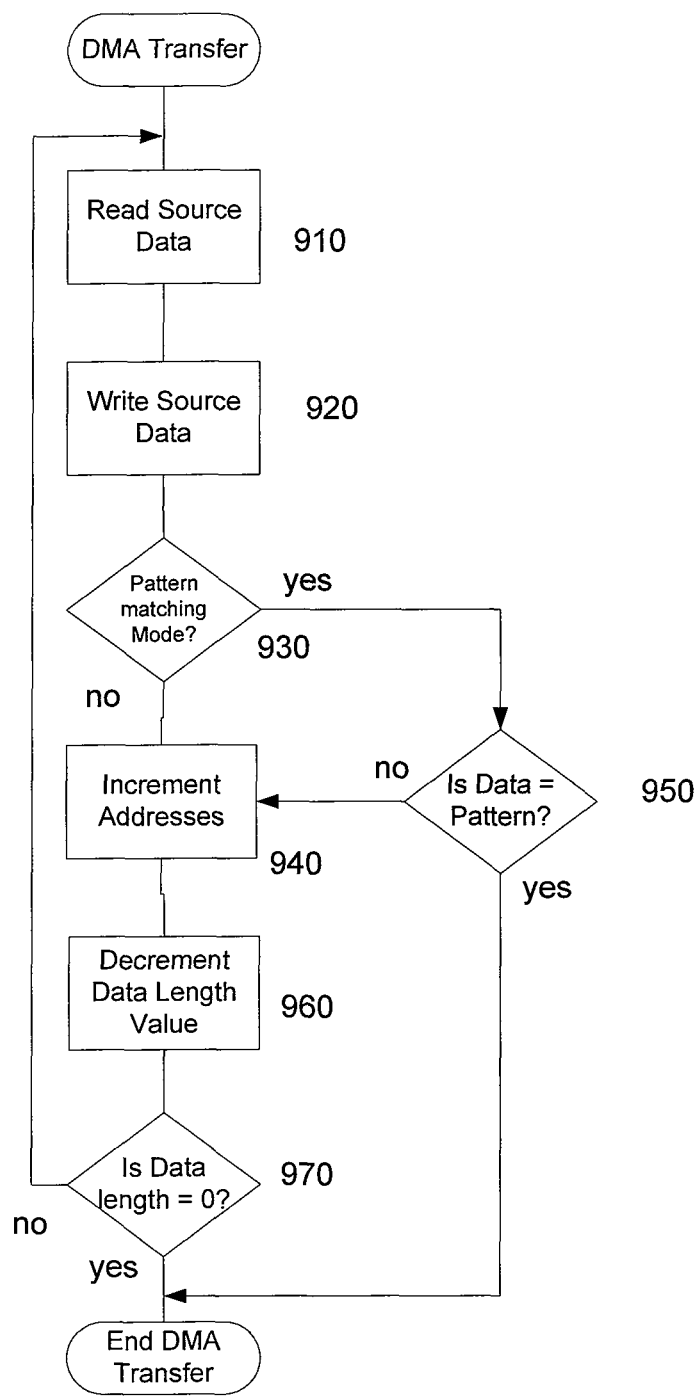
FIG. 9 shows a flowchart of a transfer routine of a DMA controller.

FIG. 9 shows a flow chart of an embodiment of a DMA transfer routine such as steps 740-750 of FIG. 7 in more detail. The routine starts in step 910 in which the source data under the start address is read. In step 920 this data written to the destination address. In step 930 it is checked whether the pattern matching mode has been set. If not, the source address and destination address are incremented and in step 960 the data length value is decremented. In step 970 it is checked whether the data length value is 0. If yes, the transfer ends, if not the routine returns to step 910. If the pattern mode has been set, the routine branches from step 930 to step 950 in which it is checked whether the data matches the pattern. If a match occurs, then the transfer ends. Otherwise, the routine continues with step 940 as stated above.

In summary, because the CPU does not wake up during a DMA transaction, the processor must not fetch instructions and unnecessarily consume energy to figure out why it woke up. As stated above, the fetches consume power when accessing the FLASH memory. The program, memory can remain powered off when the DMA controller is woken up as no transfers from and to a program memory are performed. Thus, only those components necessary for a DMA transaction will be activated and can return to sleep after the transaction has been completed. Also, if necessary, the DMA controller can be programmed to be suspended. A respective bit in a general control register or priority scheme or a signal can be used to suspend the complete DMA module. However, individual channels can also be suspended through a dedicated channel control register or priority scheme. Thus, access to a bus can be freed for the CPU if necessary.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A microcontroller comprising:
   a bus;
   a central processing unit (CPU) coupled with said bus;
   a memory coupled with said bus;
   a plurality of peripherals coupled with the bus;
   a direct memory access (DMA) controller having a plurality of DMA channels and operating independently from said CPU and being coupled with said bus, wherein for access to said bus said DMA controller is programmable in a first mode to have priority over said CPU and the plurality of peripherals and in a second mode to immediately suspend data transfer on all DMA channels and grant the CPU direct access to the bus.

2. The system according to claim 1, further comprising a control register coupled with said DMA controller and for programming said DMA controller, said control register comprising a bit for setting said first or second mode.

3. The system according to claim 1, wherein said first or second mode are programmable through a control signal fed to said DMA controller.

4. The system according to claim 1, wherein each of said plurality of DMA channels has an assigned priority level.

5. The system according to claim 1, wherein said DMA controller comprises for each channel a channel control register.

6. The system according to claim 5, wherein each channel control register comprises a programmable bit controlling whether said channel is enabled or disabled.

7. The system according to claim 4, wherein said first or second mode is programmable through a control signal fed to said DMA controller comprising a priority level.

8. A method for performing a data transmission within a microcontroller according to claim 1, the method comprising:
   programming said DMA controller to operate in the first mode, wherein upon request for a DMA data transmission, granting the DMA controller access to said bus;
   thereafter programming said DMA controller to operate in the second mode to immediately suspend data transfer on all DMA channels;
   granting the master device access to said bus;
   performing at least one bus access by said master device; and
   thereafter programming said DMA controller to operate in the first mode to resume data transfer on all DMA channels.

9. The method according to claim 8, wherein said steps of programming said DMA controller are performed by a configurable register.

10. The method according to claim 9, wherein said steps of programming said DMA controller are performed by setting and resetting a bit in said configurable register.

11. The method according to claim 8, wherein said steps of programming said DMA controller are performed by feeding a control signal to said DMA controller.

12. The method according to claim 11, wherein said control signal is generated from an exception signal fed to the master device.

13. The method according to claim 8, wherein if a data transfer of said data transfer has been initiated by said DMA controller before suspension has been initiated then finishing said data transfer and then suspending access of said DMA controller.

14. The method according to claim 8, wherein said master device is a central processing unit (CPU) and said step of programming is performed by said CPU.

15. The method according to claim 8, wherein said master device is a peripheral device and said step of programming is performed by a central processing unit.

16. The method according to claim 8, wherein said DMA controller is operable to cycle through multiple DMA channels transactions of DMA channels having the same priority level.

17. A method for performing a data transmission over a bus coupled with a master device and a direct memory access (DMA) controller having a plurality of DMA channels; the method comprising:
   providing the master device coupled with the bus, a memory coupled with the bus, a plurality of peripheral devices coupled with the bus and the DMA controller coupled with the bus within a microcontroller;
   assigning each of said plurality of DMA channels a priority level;
   upon request for a DMA data transmission, granting the DMA controller access to said bus with one of said plurality of DMA channels;
   feeding a suspend command having a priority level to said DMA controller;

if said priority level in said suspend command is higher than a priority level of said DMA channel having access to said bus, then
suspending any DMA channel having a lower priority than said priority level in said suspend command from accessing said bus;
if no other DMA channel has access to said bus, then granting the master device access to said bus;
performing at least one bus access by said master device;
feeding a resume command to said DMA controller to resume said DMA data transmission.

18. The method according to claim 17, wherein said DMA controller is operable to cycle through multiple DMA channels transactions of DMA channels having the same priority level.

19. The method according to claim 17, wherein said master device is a central processing unit of the microcontroller.

20. The method according to claim 17, wherein said steps of programming said DMA controller are performed by setting and resetting a bit in a configurable register of the microcontroller.

* * * * *